United States Patent
Monhollen et al.

(10) Patent No.: US 6,186,527 B1
(45) Date of Patent: Feb. 13, 2001

(54) MUD FLAP ASSEMBLY

(76) Inventors: Garry Monhollen, 9506 S. Charleston Pike, S. Charleston, OH (US) 45368; Michael D. Ewing, P.O. Box 434, McMinnville, OR (US) 97128

( * ) Notice: Under 35 U.S.C. 154(b), the term of this patent shall be extended for 0 days.

(21) Appl. No.: 09/036,120

(22) Filed: Mar. 6, 1998

(51) Int. Cl.$^7$ .................................................. B62D 25/18
(52) U.S. Cl. ........................................... 280/154; 280/851
(58) Field of Search .................................. 280/847, 848, 280/849, 851, 154, 159, 160; 296/198

(56) References Cited

U.S. PATENT DOCUMENTS

| | | | |
|---|---|---|---|
| 2,012,921 | * | 8/1935 | Bahr ..................... 280/851 |
| 2,755,484 | * | 7/1956 | Hotz ..................... 280/851 |
| 3,158,386 | * | 11/1964 | Tillinghast et al. ........ 280/851 |
| 3,219,363 | * | 11/1965 | Dalsey et al. ............ 280/851 |
| 3,285,624 | | 11/1966 | Aber et al. .............. 280/154 |
| 3,684,312 | | 8/1972 | Evans ..................... 280/154 |
| 3,700,260 | | 10/1972 | Moore et al. ............. 280/154 |
| 3,726,544 | | 4/1973 | Miller .................... 280/154 |
| 3,899,193 | | 8/1975 | Evans ..................... 280/154 |
| 4,043,568 | | 8/1977 | Hollon ................... 280/154 |
| 4,326,727 | | 4/1982 | Rock ..................... 280/154 |
| 4,487,422 | * | 12/1984 | Turunen ................. 280/851 |
| 4,505,010 | * | 3/1985 | Arenhold ............... 280/154 |
| 4,572,532 | | 2/1986 | Early et al. ............. 280/154 |
| 4,923,215 | | 5/1990 | Williams ................ 280/851 |
| 5,026,094 | | 6/1991 | Haddox ................. 280/848 |
| 5,044,667 | | 9/1991 | Manning ................ 280/851 |
| 5,048,868 | * | 9/1991 | Arenhold ............... 280/848 |

FOREIGN PATENT DOCUMENTS

585093 * 2/1925 (FR) ..................... 280/851

2042619 * 9/1980 (GB) ..................... 280/851

* cited by examiner

*Primary Examiner*—Frank Vanaman
(74) *Attorney, Agent, or Firm*—Thompson Hine & Flory LLP

(57) ABSTRACT

A mud flap retainer system includes a mud flap retainer member; a plurality of threaded studs extending substantially horizontally and rearward from the rear face of the mud flap retainer member and positioned between the top and bottom ends of the mud flap retainer member; a plurality of nuts, sized for being threaded onto the threaded studs; and a plurality of coupling shoes. Each coupling shoe includes a bore extending substantially horizontally therethrough for receiving a corresponding one of the threaded studs. Thus the shoes can be positioned on the retainer member by sliding threaded studs through the bores. By holding the mud flap between the retainer member and the shoes, and below the threaded studs, and by threading the nuts onto the ends of the threaded studs extending through the rear opening of the bores, the shoes are caused to be pressed towards the retainer member, which in turn, causes the mud flap to be retained between the retainer member and the shoes. The shoes preferably include a projection extending forward from the forward face of the coupling shoe and positioned above the bore. The projection is adapted to abut the rear face of the stationary member, thereby providing a fulcrum for the coupling shoe when the nuts are tightened on the studs extending through the bores. Further, each coupling shoe also preferably includes at least one tooth extending forward from the forward face of the coupling shoe below the bore, where the tooth is adapted to grip a mud flap positioned between the mud flap retainer member and the coupling shoe when the nuts are tightened onto the studs extending through the bores. Preferably, the nuts are capped nuts so as to protect the threads of the studs.

9 Claims, 3 Drawing Sheets

MUD FLAP ASSEMBLY

BACKGROUND

The present invention relates to a mechanism for securing a mud flap to a vehicle; and more particularly, to a mechanism that facilitates the installation of a mud flap to a vehicle that requires only one person to install the mud flap, using only one tool, and not requiring any specialized types or forms of mud flaps.

Mud flaps are commonly hung behind tires of motor vehicles to prevent, in part, the throwing of mud, water, stones, gravel or other objects back into the windshields of vehicles following behind. State laws require that mud flaps be used on trucks, tractors and trailers; and the state laws often define certain guidelines for the size and positioning of the mud flaps with respect to the vehicle and with respect to the road.

Often times, when such heavy vehicles are being driven in reverse, the mud flaps will be caught between the rotating rear wheels of the heavy vehicle and an object such as a mound of dirt or a curb, causing the mud flap to be torn or pulled out from the mud flap retainer system mounted to the underside of the heavy vehicle. Accordingly, when this happens, a mud flap will have to be re-installed soon thereafter so as to avoid violating any of the State guidelines. Many conventional mud flap retainer assemblies require specialized mud flaps. For example, mud flap assemblies shown in U.S. Pat. No. 3,285,624 to Aber et al., U.S. Pat. No. 4,043,568 to Hollon and U.S. Pat. No. 5,026,094 to Haddox require the mud flaps to include holes or apertures for receiving corresponding studs or projections extending from the mud flap retainers. Therefore, when such specialized mud flaps are torn or ripped from their respective retainer assemblies, the holes in the mud flaps will often be ripped out or damaged, thereby ruining the ability for that mud flap to be reattached to the retainer assembly. Therefore, to re-hang the damaged mud flap the driver or technician will have to cut away the portions of the mud flaps with the damaged holes and then punch new holes into the mud flap. Otherwise, a new mud flap will need to be installed.

Other conventional mud flap assemblies, such as those shown in U.S. Pat. No. 4,326,727 to Rock and U.S. Pat. No. 5,044,667 to Manning require the mud flaps to have upper ends terminating in specialized bosses or lugs so as to be retained within correspondingly shaped channels or grooves in the retainer assembly. Accordingly, if such mud flaps were torn from the retainer assemblies, often times the bosses or lugs on the upper end of the mud flap will be damaged, thereby ruining the use of that mud flap within the specialized retainer assembly. Because of the specialized design of such mud flaps, the driver will seldom be able to repair the damaged portions, thereby requiring the use of a new mud flap.

Still other known mud flap retainer assemblies fail to facilitate the quick and simple re-installation of a new or damaged mud flap to the mud flap retainer assembly by a single individual. Accordingly, there is a need for a mud flap retainer assembly which allows a single person to install a mud flap to the retainer assembly, using a minimal amount of tools and requiring a minimal amount of time. There is also a need for a mud flap retainer assembly which allows the use of non-specialized mud flaps, and also allows ripped or damaged mud flaps to be easily re-installed.

SUMMARY

The mud flap retainer system of the present invention comprises a mud flap retainer member; a plurality of threaded studs extending substantially horizontally and rearward from the rear face of the mud flap retainer member and positioned between the top and bottom ends of the mud flap retainer member; a plurality of nuts, sized for being threaded onto the threaded studs; and a plurality of coupling shoes. Each coupling shoe includes a bore extending substantially horizontally therethrough for receiving a corresponding one of the threaded studs. Thus the shoes can be positioned on the retainer member by sliding threaded studs through the bores. By holding the mud flap between the retainer member and the shoes, and below the threaded studs, and by threading the nuts onto the ends of the threaded studs extending through the rear opening of the bores, the shoes are caused to be pressed towards the retainer member, which in turn, causes mud flap to be retained between the retainer member and the shoes.

The shoes preferably include a projection extending forward from the forward face of the coupling shoe and positioned above the bore. The projection is adapted to abut the rear face of the stationary member, thereby providing a fulcrum for the coupling shoe when the nuts are tightened on the studs extending through the bores. Preferably, each coupling shoe also includes at least one tooth extending forward from the forward face of the coupling shoe below the bore, where the tooth is adapted to grip a mud flap positioned between the mud flap retainer member and the coupling shoe when the nuts are tightened onto the studs extending through the bores. Preferably, the nuts are capped nuts so as to protect the threads of the studs.

Accordingly, a mud flap may be easily installed onto the mud flap retainer assembly by a single individual according to the following steps: first, the individual will position a first one of the coupling shoes onto the retainer member so that a first one of the threaded studs is received in a forward opening of the bore extending through the coupling shoe, and will slide the first coupling shoe forward along the first threaded stud until a portion of the first threaded stud protrudes through the rear opening of the bore; next, the individual will thread a nut onto the portion of the first threaded stud protruding through the rear opening of the bore; finally, while holding a first portion of the mud flap with one hand, below the first threaded stud and between the rear face of the mud flap retainer member and the forward face of the first coupling shoe, the individual uses the other hand to tighten the nut with a wrench, thereby pressing the first portion of the mud flap between the mud flap retainer member and the forward face of the first coupling shoe. Once the first portion of the mud flap is retained, the individual will easily position a second one of the coupling shoes onto a second one of the threaded studs as above, threading a nut on the portion of the second threaded stud protruding through the rear opening of the bore, and while using one hand to hold a second portion of the mud flap below the second threaded stud, between the rear face of the mud flap retainer member and the forward face of the second coupling shoe, using the other hand to tighten the nut on the second threaded stud with the wrench, thereby pressing the second portion of the mud flap between the mud flap retainer member and the forward face of the first coupling shoe.

Accordingly, it is an object of the present invention to provide a mud flap retainer assembly and a method for using the mud flap retainer assembly that requires only one person to install the mud flap to the retainer assembly and allows the use of non-specialized mud flaps or even mud flaps that have been damaged or ton. Other objects and advantages of the present invention will be apparent from the following description, the accompanying drawings and the appended claims.

DETAILED DESCRIPTION

Figure 1:
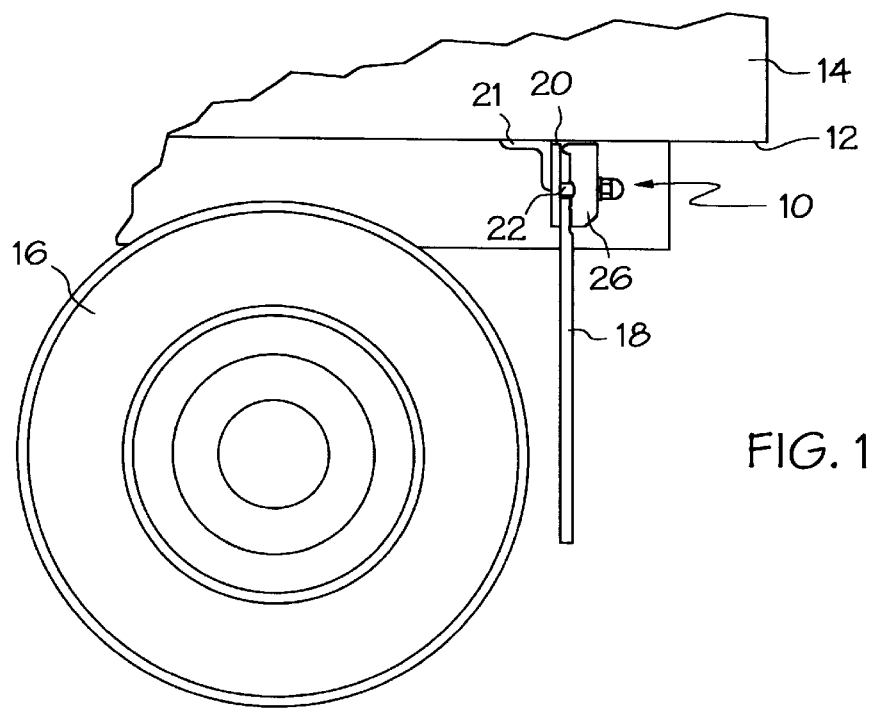
FIG. 1 is a fragmentary, side elevational view of the mud flap retainer assembly of the present invention installed behind the rear wheel of a semi-tractor trailer.

As shown in FIG. 1, a mud flap retainer assembly, generally designated as 10, is mounted onto the underside 12 of a semi-tractor trailer 14, behind the rear wheel or tire 16 of the semi-tractor trailer. The mud flap retainer assembly 10 retains a mud flap 18 thereon.

Figure 2:
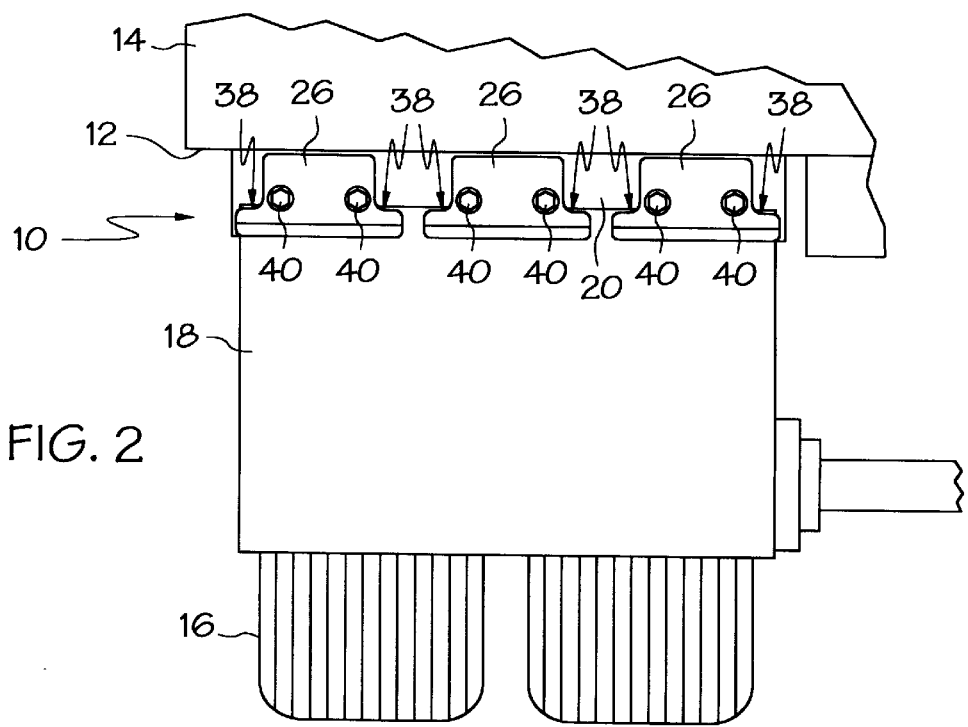
FIG. 2 is a fragmentary, elevational rear view of the mud flap retainer assembly installed behind the rear wheel of the semi-tractor trailer.

As shown in FIGS. 1–4, the mud flap retainer assembly 10 includes a mud flap retainer member in the form of a substantially flat retainer plate 20, mounted to an L-shaped bracket 21, which is in turn mounted to the underside 12 of the semi-tractor trailer 14. The retainer plate 20 preferably has a length approximately equal to the width of the tire 16 (or tires as shown in FIG. 2), and extends along the width of the tire so that the mud flap 18 hung thereon will prevent the throwing of mud, water, stones, gravel or other objects back to following vehicles. The retainer plate 20 can be welded or bolted to the bracket 21, or may otherwise be mounted to extend downwardly from any other portion of the semi tractor trailer 14, using any suitable mounting means as known to those of ordinary skill in art.

The retainer plate 20 also includes a plurality of threaded studs 22 extending substantially horizontally and rearward from the vertical rear face 24 of the retainer plate 20. The threaded studs 22 are preferably welded to the rear face 24 of the mud flap retainer plate 20, but may also be fixedly attached thereto using other suitable means as known to those of ordinary skill in the art. The retainer plate 20 and the associated threaded studs 22 are preferably cast or machined from iron or another suitable, preferably metallic, material.

Figure 3:
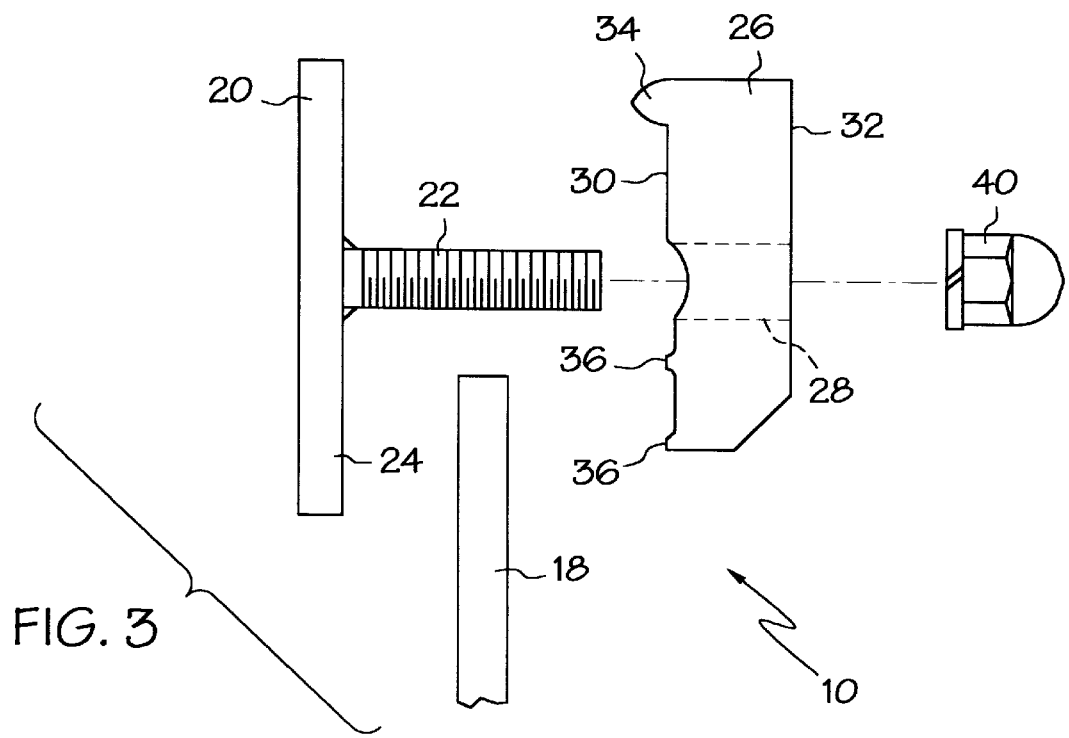
FIG. 3 is an exploded, side elevational view of the mud flap retainer assembly of the present invention.
Figure 4:
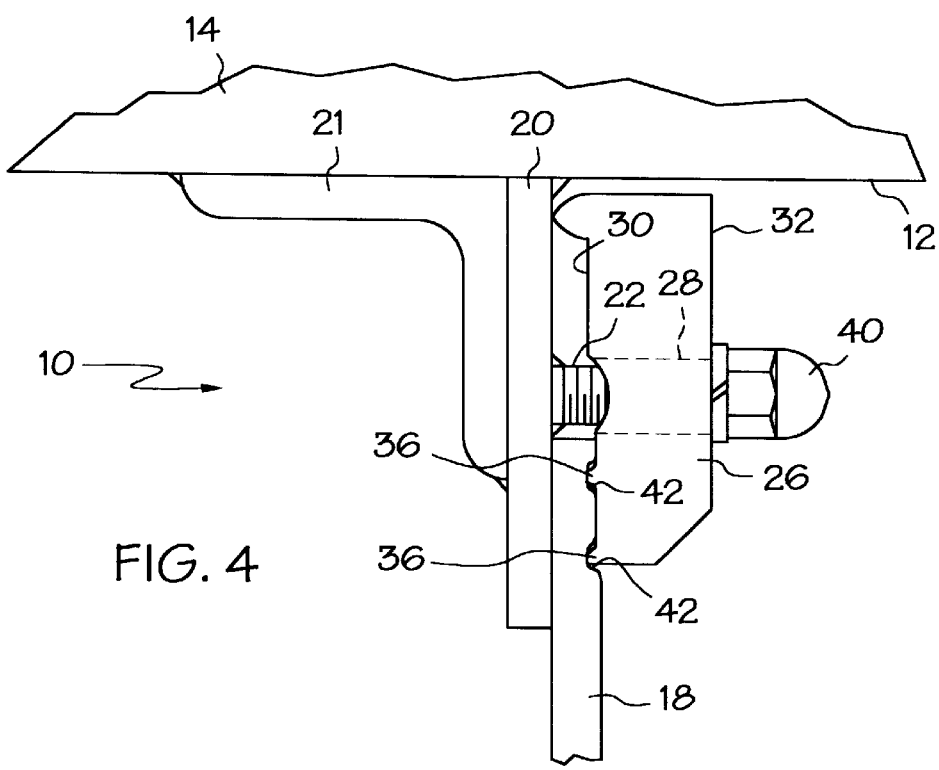
FIG. 4 is a magnified view of the mud flap retainer assembly shown in FIG. 1.
Figure 6:
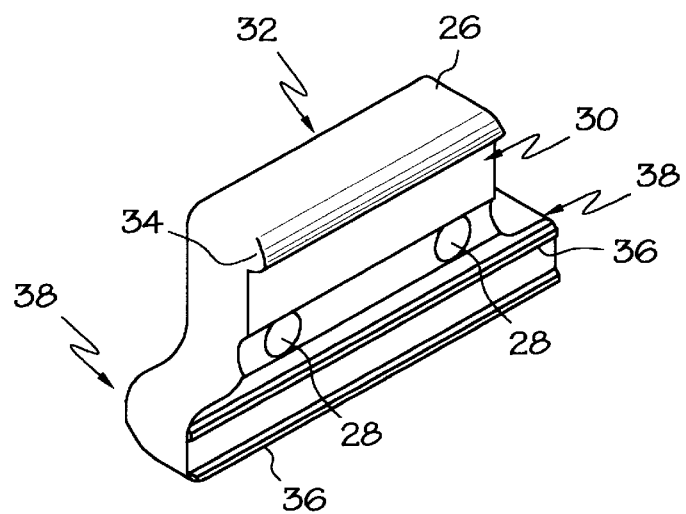
FIG. 6 is a perspective view showing a front face of a coupling shoe for use with the mud flap retainer assembly of the present invention.

The mud flap retainer assembly 10 also includes a plurality of coupling shoes 26 which are received on the plurality of threaded studs 22. Referring to FIGS. 3, 4 and 6, each of the coupling shoes 26 preferably includes a pair of bores 28 extending completely therethrough from a forward face 30 to a rear face 32 of the coupling shoe. Each of the bores 28 are preferably aligned along a single vertical plane. Each of the coupling shoes 26 also includes a projection, such as a substantially pointed or dome shaped rib 34, extending forward from the forward face 32 of the coupling shoes and longitudinally along the upper end of the forward face. The coupling shoe 26 also preferably includes a pair of rib-like teeth 36 extending forward from the forward face 30, below the bores 28; and extending parallel to each other, longitudinally along the forward face 30. Referring to FIGS. 2 and 6, each coupling shoe 26 also preferably includes a pair of flared portions 38 to extend the longitudinal surface area of the teeth 36. Referring to FIG. 2, three coupling shoes 26 arc used in this embodiment to lock onto a large percentage of the mud flap's length. Of course, more or fewer coupling shoes may be used depending upon the application; however, in the preferred embodiment, at least two of the coupling shoes are used.

The coupling shoes are preferably cast or machined from aluminum or another suitable, preferably metallic, material.

Referring back to FIGS. 1–4, the mud flap retainer assembly 10 also includes a plurality of nuts, such as capped nuts 40. Thus the coupling shoes 26 may be positioned on the retainer plate 20 by sliding threaded studs 22 through the bores 28. By holding the mud flap 18 between the retainer plate 20 and the coupling shoes 26, and below the threaded studs 22, and by threading the capped nuts 40 onto the ends of the threaded studs 22 extending out from the rear face 32, the coupling shoes 26 are caused to be pressed towards the retainer plate 20, which in turn, causes mud flap 18 to be retained between the retainer plate 20 and the coupling shoes 26. When the capped nuts 40 arc tightened, the fulcrum provided by the pointed rib 34 causes the teeth 36 to be levered towards the mud flap 18. To provide such a fulcrum, the pointed rib 34 preferably has a horizontal height that is substantially equal to the thickness of the mud flap, and the teeth 36 have a horizontal height that are substantially smaller than the thickness of the mud flap. Preferably, the teeth 36 have a horizontal height that is less than half the thickness of a mud flap 18. Capped nuts 40 are preferred to protect the threads of the threaded studs 22 from damage.

As will be appreciated by those of ordinary skill in the art, other mechanical press mechanisms, which couple to the studs extending out from the rear face of the coupling shoes and simultaneously press the coupling shoes forward towards the retainer plate, may be used in place of the capped nuts, such as cam-lock mechanisms.

Figure 5:
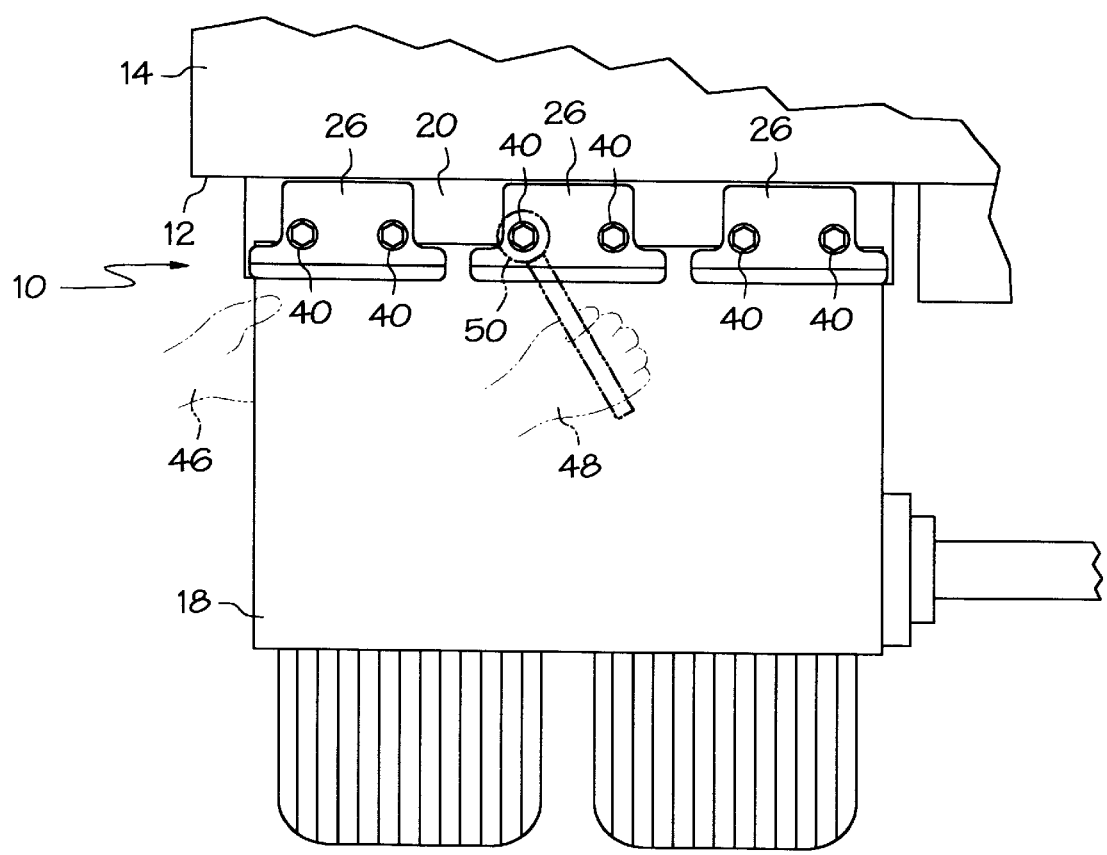
FIG. 5 is the view of the mud flap retainer assembly shown in FIG. 2, further showing an installation step of a mud flap onto the mud flap retainer assembly.

As shown in FIGS. 3–5, mud flap 18 is installed onto the mud flap retainer assembly according, generally, to the following steps: first, the plurality of coupling shoes 26 are positioned on the corresponding plurality of threaded studs 22 and are slid forwardly therealong leaving a gap between the coupling shoes 26 and the forward face 24 of the retainer plate 20 sufficient for inserting the mud flap 18 therebetween; next, the capped nuts 40 are loosely threaded onto the ends of the threaded studs 22 extending outwardly through the rear openings of the bores 28; next, the mud flap is positioned between the forward face 24 of the retainer assembly 20 and the plurality of shoes 26, below the plurality of studs 22; finally, the capped nuts 40 are tightened thereby pressing the plurality of shoes 26 towards the rear face 24 of the retainer plate 20. As discussed above, when the capped nuts 40 are sufficiently tightened, the pointed rib 34 provides a fulcrum such that the teeth 36 are levered towards the mud flap 18. Exaggerated indentations 42 formed by the teeth 36 pressing into the mud flaps are shown in FIG. 4 to illustrate the gripping function of the teeth 36.

FIG. 5 illustrates how the mud flap 18 may be installed by a single individual with a single tool such as a crescent wrench or socket wrench. Preferably, the individual will first slide all of the coupling shoes 26 onto their respective threaded studs 22. Next, the individual will then loosely thread the plurality of capped nuts 40 onto the rearwardly projecting portions of the threaded studs 22 projecting out from the rear faces 32 of the coupling shoes 26, leaving a sufficient gap between the coupling shoes 26 and the retainer plate 20 so that the mud flap 18 can be inserted therebetween. Next, using one hand 46 the individual will hold the mud flap 18 between the rear face 24 of the retainer plate and the forward faces 30 of the coupling shoes, and using the other hand 48 the individual will tighten the capped nuts 40 on a first one of the coupling shoes with a crescent wrench 50 or socket wrench. Once a first one of the coupling shoes is securely tightened, the individual may then tighten the capped nuts on the remaining coupling shoes, thereby securely fastening the mud flap 18 to the mud flap retainer assembly 10.

Accordingly, the mud flaps used with this retainer assembly do not need any holes punched therein or specialized bosses or projections positioned on the upper ends. Furthermore, as long as a relatively straight top edge of the mud flap remains, the damaged or torn mud flap can be easily reapplied to the mud flap retainer assembly.

While the forms of apparatus herein described constitute preferred embodiments of this invention, it is to be understood that the invention is not limited to these precise forms of apparatus, and that changes may be made therein without departing from the scope of the invention.

For example, while the retainer member is preferably in the form of the retainer plate 20, thereby providing a retrofit capability to most heavy vehicles, the retainer member can take on any shape or combination of shapes capable of providing a flap receiving rear face; and preferably any shape or combination of shapes capable of providing a fulcrum receiving face such as a flat surface, a groove, and the like.

It is also within the scope of the invention to provide a mud flap assembly comprising a first stationary member mounted to a vehicle; a plurality of studs extending substantially horizontally and rearwardly from the vehicle and positioned above at least a flap receiving portion of the rear face of the first stationary member; a plurality of coupling shoes, each having a bore extending substantially horizontally there through, each bore receiving a corresponding one of the studs, each coupling shoe including a forward face facing the flap receiving portion of the first stationary member; a mud flap positioned between the flap receiving portion of the stationary member and the forward faces of the coupling shoes, and further positioned below the plurality of studs; and a plurality of mechanical presses, each forcing a corresponding one of the coupling shoes towards the stationary member, thereby retaining the mud flap between the rear face of the stationary member and the forward faces of the coupling shoes. It is also within the scope of the invention to provide a second stationary member, including a rear face positioned above the plurality of studs, where each of the coupling shoes includes a forward extending projection, positioned above the bore and abutting the rear face of the second stationary member, thereby providing a fulcrum for the coupling shoe; and it is further within the scope of the invention that each of the coupling shoes further includes a forward extending tooth, positioned below the bore and pressing against the mud flap, thereby gripping the mud flap. As shown in the preferred embodiment, above, the first and second stationary members may be part of a unitary a retainer member or retainer plate, where the studs extend horizontally therefrom.

What is claimed is:

1. A mud flap assembly comprising:
   a plurality of studs, adapted to be fixedly attached to and extending substantially horizontally and rearwardly from a vehicle;
   a stationary member adapted to be mounted to the vehicle, the stationary member including a rear face positioned below the plurality of studs;
   a plurality of coupling shoes, each having a bore extending substantially horizontally therethrough, each bore receiving a corresponding one of the studs, each coupling shoe including a forward face facing the rear face of the stationary member positioned below the plurality of studs;
   a mud flap positioned between the rear face of the stationary member positioned below the plurality of studs and the forward faces of coupling shoes and positioned completely below the plurality of studs; and
   a plurality of mechanical presses, each forcing a corresponding one of the coupling shoes towards the stationary member, thereby retaining the mud flap between the rear face of the stationary member positioned below the plurality of studs and the forward faces of the coupling shoes;
   the stationary member further including a rear face positioned above the plurality of studs; and
   each of the coupling shoes including a forward extending projection, positioned above the bore and abutting the rear face of the stationary member positioned above the plurality of studs, the forward extending projection providing a fulcrum for a coupling shoe.

2. The mud flap assembly of claim 1, wherein each of the coupling shoes further includes a forward extending tooth, positioned below the bore and pressing against the mud flap, thereby gripping the mud flap.

3. The mud flap assembly of claim 2, wherein the forward extending projection has a horizontal height substantially equal to a thickness of the mud flap and wherein the forward extending tooth has a horizontal height that is less than half the thickness of the mud flap.

4. The mud flap assembly of claim 1, wherein:
   the plurality of studs are threaded and extend completely through the bores of the corresponding coupling shoes; and
   the plurality of mechanical presses are a plurality of nuts threaded onto portions of the studs extending rearward out through the bores.

5. The mud flap assembly of claim 4, wherein the nuts are capped nuts.

6. The mud flap assembly of claim 1, wherein the plurality of studs are fixedly attached to and extend from the stationary member.

7. The mud flap assembly of claim 1, wherein each of the coupling shoes includes at least a pair of the bores, horizontally aligned with each other, each of the bores receiving a respective one of a corresponding pair of the studs extending therethrough.

8. A mud flap assembly comprising:
   a stationary member adapted to be mounted to a vehicle, the stationary member including a rear face, a top edge and a bottom edge;
   a plurality of threaded studs, fixedly attached to and extending substantially horizontally and rearward from the rear face of the stationary member, and positioned between the top and bottom edges of the rear face of the stationary member;
   a plurality of coupling shoes, each having a forward face and a rear face, each of the coupling shoes including at least two bores extending substantially horizontally therethrough from the forward face to the rear face of the coupling shoe, the bores being aligned along a vertical plane, each bore receiving at least a respective one of the threaded studs extending completely therethrough wherein an end portion of the threaded stud extends rearward out through the bore;

a mud flap positioned between the rear face of the stationary member and forward faces of the plurality of coupling shoes and positioned completely below the threaded studs; and a plurality of nuts, each nut being threaded onto a corresponding one of the end portions of the studs extending rearward out through the bores;

each of the coupling shoes further including a forward extending projection, positioned above the bores and abutting the rear face of the stationary member, the forward extending projection providing a fulcrum for the coupling shoe as the nuts are tightened on the studs; and each of the coupling shoes further including a forward extending tooth, positioned below the bores and pressing against the mud flap, thereby gripping the mud flap.

9. A mud flap assembly comprising:

a stationary member adapted to be mounted to a vehicle, the stationary member including a rear face, a top edge and a bottom edge;

a plurality of threaded studs, fixedly attached to and extending substantially horizontally and rearward from the rear face of the stationary member, and positioned between the top and bottom edges of the rear face of the stationary member;

a coupling shoe having a forward face and a rear face and including at least one bore extending substantially horizontally therethrough from the forward face to the rear face of the coupling shoe, the bore receiving at least a respective one of the threaded studs extending completely therethrough wherein an end portion of the threaded stud extends rearward out through the bore;

a mud flap positioned between the rear face of the stationary member and forward face of the coupling shoe and positioned completely below the threaded studs; and a nut threaded onto the end portion of the respective one of the threaded studs extending rearward out through the bore;

the coupling shoe further including a forward extending projection, positioned above the bore and abutting the rear face of the stationary member, the forward extending projection providing a fulcrum for the coupling shoe as the nut is tightened on the respective one of the threaded studs; and each coupling shoe further including a forward extending tooth, positioned below the bore and pressing against the mud flap, thereby gripping the mud flap.

* * * * *